United States Patent
Li et al.

(10) Patent No.: US 11,174,189 B2
(45) Date of Patent: Nov. 16, 2021

(54) APPARATUS FOR PRODUCTION OF CURVED GLASS AND METHOD FOR MANUFACTURING SAME

(71) Applicant: Shenzhen Jingjiang Yunchuang Technology Co., Ltd., Shenzhen (CN)

(72) Inventors: Jun-Qi Li, Shenzhen (CN); Qing Liu, Shenzhen (CN); Xiao-Bo Yuan, Shenzhen (CN); Li-Feng Zhan, Shenzhen (CN); Ya-Li Sun, Shenzhen (CN); Shang-Ming Huang, Shenzhen (CN); Kun-Lin Zou, Huizhou (CN); Xiao-Gen Li, Huizhou (CN); Man Wang, Huizhou (CN)

(73) Assignee: Shenzhen Jingjiang Yunchuang Technology Co., Ltd., Shenzhen (CN)

( * ) Notice: Subject to any disclaimer, the term of this patent is extended or adjusted under 35 U.S.C. 154(b) by 369 days.

(21) Appl. No.: 16/234,905

(22) Filed: Dec. 28, 2018

(65) Prior Publication Data

US 2020/0115268 A1 Apr. 16, 2020

(30) Foreign Application Priority Data

Oct. 15, 2018 (CN) .......................... 201811198543.3

(51) Int. Cl.
*C03B 11/02* (2006.01)
*C03B 32/02* (2006.01)
(Continued)

(52) U.S. Cl.
CPC ............ *C03B 32/02* (2013.01); *C03B 11/005* (2013.01); *C03B 11/05* (2013.01);
(Continued)

(58) Field of Classification Search
CPC ........................... C03B 11/02; C03B 2215/80
See application file for complete search history.

(56) References Cited

U.S. PATENT DOCUMENTS 3,298,812 A * 1/1967 Holland .................. C03B 11/02
65/260
3,796,557 A 3/1974 Sponseller
(Continued)

FOREIGN PATENT DOCUMENTS

CN 101293728 A 10/2008
CN 102531397 B 12/2014
(Continued)

*Primary Examiner* — Cynthia Szewczyk
(74) *Attorney, Agent, or Firm* — ScienBiziP, P.C.

(57) ABSTRACT

A production apparatus making continuously curved crystalline glass as a cover or container includes a melting device, a drainage device, a molding device, and a crystallizing device. The melting device melts glass raw material to form a glass melt. The drainage device drains the glass melt to the molding device. The molding device includes a rotating table and a plurality of molding molds thereon. Each molding mold can be moved toward or away from the drainage device by the rotating table. Each molding mold has a molding cavity. At least one part of the molding cavity includes a plane, and at least one part of the molding cavity includes a curved surface to extrude the glass melt with such different surface forms. The crystallizing device crystallizes the curved glass member to achieve the curved crystallized glass member. A method for manufacturing such glass is also provided.

11 Claims, 5 Drawing Sheets

(51) Int. Cl.
*C03B 11/00* (2006.01)
*C03B 11/05* (2006.01)
*C03C 10/00* (2006.01)
*C03C 10/16* (2006.01)

(52) U.S. Cl.
CPC .......... *C03C 10/0045* (2013.01); *C03C 10/16* (2013.01); *C03C 2204/00* (2013.01)

(56) References Cited

U.S. PATENT DOCUMENTS

| | | | | |
|---|---|---|---|---|
| 5,588,979 | A * | 12/1996 | Miyazaki | C03B 7/07 65/164 |
| 5,626,641 | A * | 5/1997 | Yonemoto | C03B 7/12 65/122 |
| 5,931,152 | A | 8/1999 | Fafet et al. | |
| 2006/0059949 | A1* | 3/2006 | Fujimoto | C03B 11/02 65/32.5 |
| 2008/0022722 | A1* | 1/2008 | Hsueh | C03B 32/02 65/33.1 |
| 2014/0026618 | A1* | 1/2014 | Chung | C03B 11/07 65/32.5 |

FOREIGN PATENT DOCUMENTS

| | | | |
|---|---|---|---|
| GB | 1027903 | A | 4/1966 |
| TW | I405735 | B | 8/2013 |
| TW | 201623179 | A | 7/2016 |

* cited by examiner

APPARATUS FOR PRODUCTION OF CURVED GLASS AND METHOD FOR MANUFACTURING SAME

FIELD

The subject matter herein generally relates to a glass production.

BACKGROUND

Crystalline glass, also known as glass-ceramic, has low expansion, high temperature resistance, thermal shock resistance, and high transparency. It is widely used in electronic materials for Computer, Communication, and Consumer Electronic (3C) purposes, astronomical telescopes, tableware, high temperature resistance windows, and so on.

Non-flat glass used in 3C electronic products generally requires a small size and thinness. Conventional crystalline glass products are produced as large glass plates or large-sized glass blocks/bricks. When applied to 3C electronic products, the glass-ceramic products may need to be cut into small pieces, and then the small pieces of the glass-ceramic are thermoformed to achieve curved glass.

BRIEF DESCRIPTION OF THE DRAWINGS

Implementations of the present technology will now be described, by way of embodiments, with reference to the attached figures.

DETAILED DESCRIPTION

Figure 1:
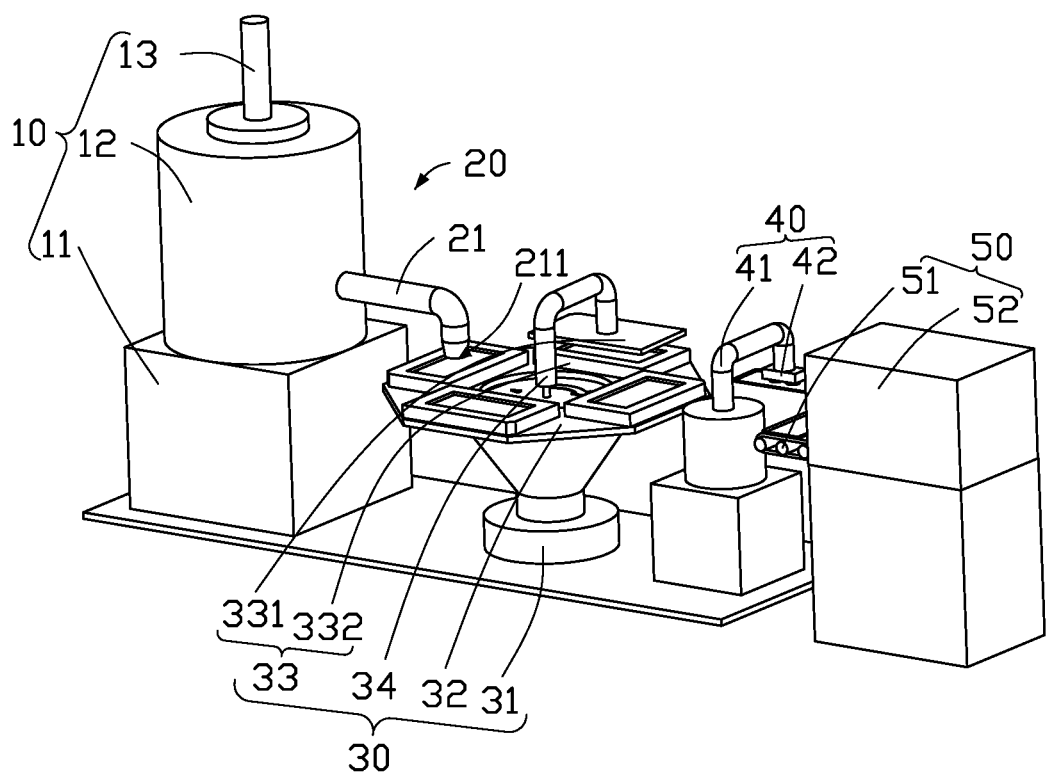
FIG. 1 is an isometric view of a glass production apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to illustrate details and features of the present disclosure better.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

Several definitions that apply throughout this disclosure will now be presented.

Figure 2:
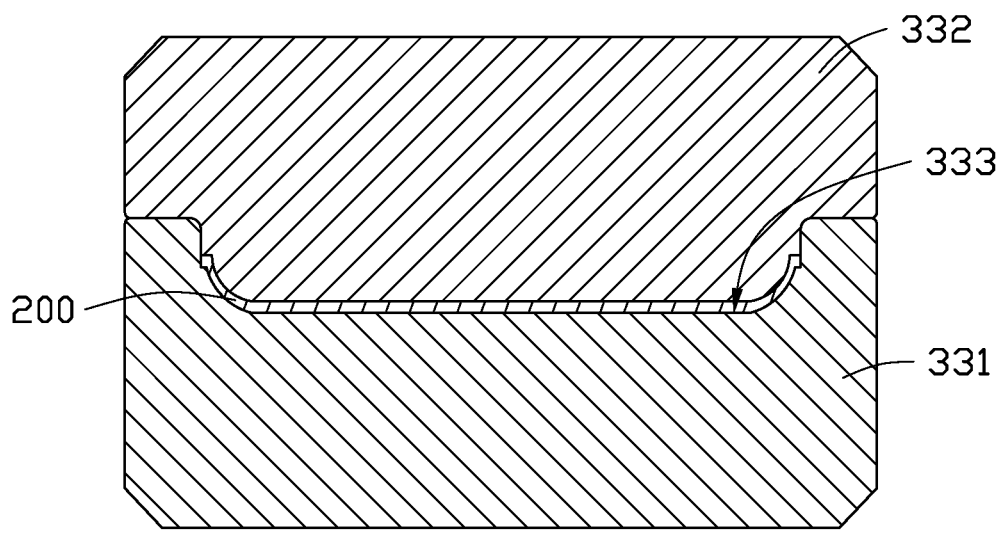
FIG. 2 is a cross-sectional view of a hot pressing molding mold of the glass production apparatus of FIG. 1 and a curved glass member.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like FIG. 1 illustrates a glass production apparatus 100 configured to continuously prepare a curved crystalline glass member. The glass production apparatus 100 can include a melting device 10, a drainage device 20, a molding device 30, a transferring device 40, and a crystallizing device 50. The melting device 10 can be configured to melt a glass raw material to prepare a glass melt (not shown). The drainage device 20 can be configured to drain the glass melt prepared by the melting device 10 to the molding device 30. The molding device 30 can be configured to make the glass melt to prepare a curved glass member 200 as shown in FIG. 2. The transferring device 40 can be configured to transfer the curved glass member 200 to the crystallizing device 50. The crystallizing device 50 can be configured to crystallize the curved glass member 200 to prepare a curved crystalline glass member (not shown). The curved crystalline glass member prepared by the glass production apparatus 100 of this disclosure can be applied to a mobile phone, used as a front and a rear cover plate, as a protective glass of a watch, as an instrument panel protection glass on a vehicle, as a protective glass of a wearable device, or for other purposes.

In the embodiment, the glass raw material can consist of a silicon dioxide having a mass fraction of 50%-60%, an aluminum oxide having a mass fraction of 10%-20%, a magnesium oxide having a mass fraction of 5%-10%, a titanium dioxide having a mass fraction of 2%-10%, an antimony trioxide having a mass fraction 0-2%, and an additive having a mass fraction of 5%-15%. The titanium dioxide acts as a nucleating agent to increase crystallinity of the curved crystalline glass member. The antimony trioxide acts as a clarifying agent to increase the clarity of the glass melt. The additive can be selected from one or more of sodium fluoride and magnesium fluoride. The additive can be used to improve a thermal stability of the curved crystalline glass member.

The melting device 10 has functions of heating, stirring, and filtration clarification, and is capable of melting the glass raw material at a temperature of about 1300 degrees centigrade to about 1600 degrees Celsius to prepare a clear glass melt.

In the embodiment, the melting device 10 can include a base 11, a melting furnace 12, and a heating member 13. The melting furnace 12 can be positioned on the base 11. A crucible (not shown) can be positioned in the melting furnace 12. The crucible can be configured to receive the glass raw material and the glass melts. The crucible can be made of corundum. The heating element 13 can be inserted into the melting furnace 12 to heat the melting furnace 12.

In the embodiment, the melting furnace 12 can further include a stirring mechanism (not shown) configured to stir the glass melt in the crucible to remove air bubbles.

In the present embodiment, the melting furnace 12 can further include a filtering mechanism (not shown) configured to filter the glass melt in the crucible to remove unmelted impurities in the glass melt.

In the embodiment, the melting furnace 12 can further include a sensor (not shown) configured to sense the volume or mass of the glass melt in the crucible, thus the melting furnace 12 controls the quantity of glass melt to flow to the drainage device 20.

The drainage device 20 can include a drainage tube 21, a temperature sensor, and a temperature controlling mechanism (not shown). The drainage tube 21 can be positioned on the melting furnace 12 and adjacent to a bottom of the melting furnace 12 (not shown). The drainage tube 21 can communicate with the melting furnace 12 to drain the glass melt into the molding device 30.

A section of an opening 211 of the drainage tube 21 can be designed to be a predetermined shape according to a desired shape and a size of the curved glass member 200, thus ensuring that the glass melt is completely filled into the molding mold of the molding device 30. In the embodiment, the opening 211 of the drainage tube 21 has an elliptical cross section, thus a filling rate of the glass melt in the molding mold of the molding device 30 can be 95% or more. In other embodiments, the opening 211 of the drainage tube 21 can have a rectangular cross section to enable the filling rate of the glass melt in the molding mold of the molding device 30 to be more than 90%.

In the least one embodiment, the cross section of the opening 211 of the drainage tube 21 can be other polygonal shape according to a desired shape and a size of the curved glass member 200.

The opening 211 of the drainage tube 21 and the molding mold of the molding device 30 have a predetermined height in a perpendicular direction to simultaneously cool the glass melt flowing into the molding mold of the molding device 30. A temperature of the glass melt flowing into the molding mold can be 700 to 850 degrees Celsius.

In the embodiment, the drainage tube 21 can be made of a platinum or a platinum alloy.

The temperature sensor and the temperature controlling mechanism can be positioned on the drainage tube 21. The temperature sensor can be configured to detect a temperature of the drainage tube 21. The temperature controlling mechanism can be configured to adjust a temperature of the drainage tube 21 to a preset temperature to slowly and uniformly cool the glass melt in the drainage tube 21.

The molding device 30 can include a supporting table 31, a rotary table 32, a plurality of molding molds 33, and a manipulator 34. The supporting table 31 can be adjacent to the drainage device 20. The rotary table 32 can be substantially circular. The rotary table 32 can be positioned on the supporting table 31. The plurality of molding molds 33 can be provided on the rotary table 32 and uniformly distributed in a circumferential direction of the rotary table 32. The rotary table 32 can move each molding mold 33 toward to or away from the opening 211 of the drainage tube 21. Each molding mold 33 can be configured to curvedly mold the glass melt to prepare the curved glass member 200.

Figure 4:
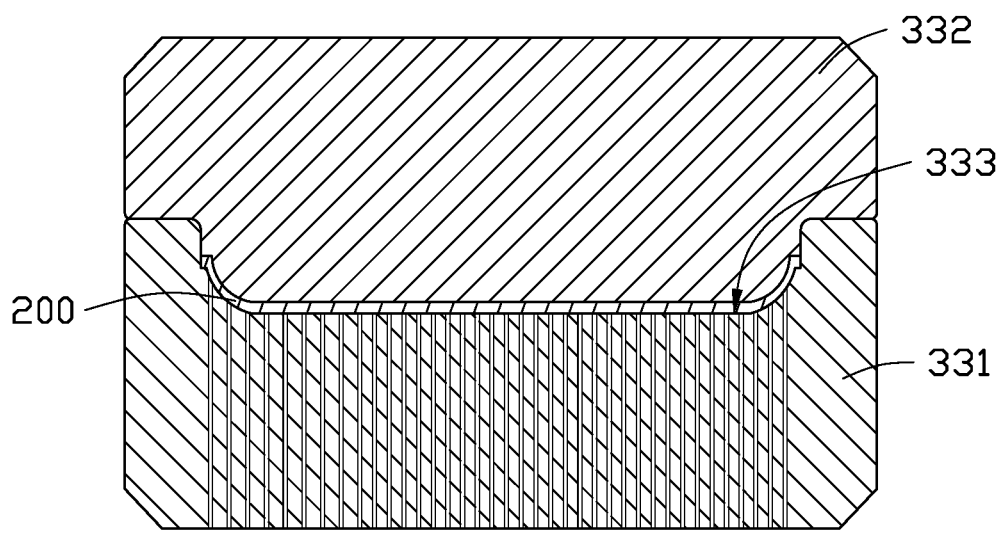
FIG. 4 is a cross-sectional view of a hot pressing and heat absorbing composite molding mold in a third embodiment of the present invention and a curved glass member.

In the embodiment, referring to FIG. 2 and FIG. 4, each molding mold 33 can be a hot press molding mold or a hot pressing and heat absorbing composite molding mold. Each molding mold 33 can include a female mold 331 and a male mold 332 engaged with the female mold 331. A molding cavity 333 can be defined between the female mold 331 and the male mold 332. At least one portion of the molding cavity 333 can include a plane surface and at least one portion of the molding cavity 333 can include a curved surface to prepare the curved glass member 200 by simultaneously molding planar and curved surfaces on the glass melt. The manipulator 34 can be positioned on the supporting table 31. The manipulator 34 can be configured to separate the male mold 332 from the female mold 331 or to engage the male mold 332 to the female mold 331 to open or close the molding mold 33.

The male mold 332 of each molding mold 33 acting as the hot press molding mold can be made of graphite or platinized cemented carbide. The male mold 332 can prepare a curved glass member by applying pressure to the glass melt received in the female mold 331.

The female mold 331 of each molding mold 33 acting as the hot pressing and heat absorbing composite molding mold can be made of graphite or a porous ceramic material. The female mold 331 can be connected to a vacuum generator (not shown). The male mold 332 can press the glass melt received in the female mold 331, and the glass melt being vacuum-adsorbed by the female mold 331 prepares the curved glass member 200 by simultaneously molding planar and curved surfaces on the glass melt.

Figure 3:
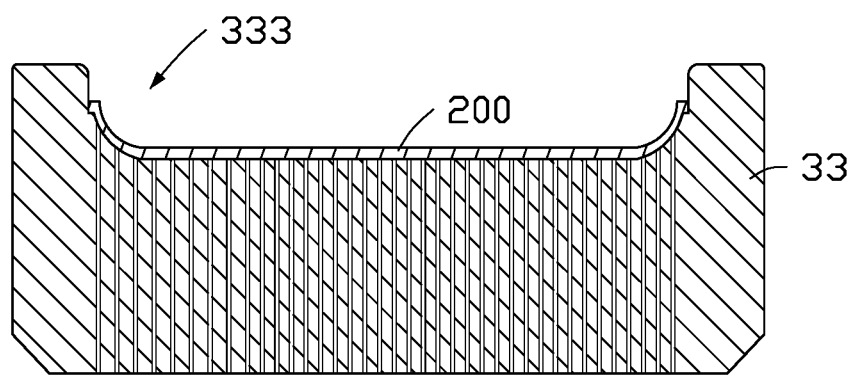
FIG. 3 is a cross-sectional view of a heat absorbing molding mold in a second embodiment of the present invention and a curved glass member.

In at least one embodiment, referring to FIG. 3, each molding mold 33 can also be a heat absorbing molding mold. Each molding mold 33 can be made of graphite or porous ceramic material. A molding cavity 333 can be defined in the molding mold 33. At least one portion of the molding cavity 333 can include a plane surface and at least one portion of the molding cavity 333 can include a curved surface to receive the glass melt. Each molding mold 33 can be connected to a vacuum generator (not shown). Each molding mold 33 can adsorb the glass melt to the curved glass member 200 by simultaneously molding planar and curved surfaces on the glass melt.

In the embodiment, the molding device 30 can further include a temperature controlling mechanism, a gas protection mechanism, and a controller (not shown). The temperature controlling mechanism can be configured to preheat each molding mold 33 to a preset temperature of 700 to 850 degrees Celsius. The gas protection mechanism can be configured to protect each molding mold 33 during molding process and cooling process in a protective atmosphere. The controller can be configured to control the temperature controlling mechanism and the gas protection mechanism.

The transferring device 40 can include a robot arm 41 and a suction member 42. The robot arm 41 can be arranged adjacent to the supporting table 31 of the molding device 30. The suction member 42 can be positioned on an end of the robot arm 41. The robot arm 41 can move the suction member 42. The suction member 42 can be configured to get the curved glass member 200 received in a molding mold 33 and to release the curved glass member 200 to the crystallizing device 50.

The crystallizing device 50 can include a transferring mechanism 51 and a crystallizing furnace 52. The transferring mechanism 51 can be configured to transfer the curved glass member 200 into the crystallizing furnace 52. The crystallizing furnace 52 can be configured to crystallize the curved glass member 200 to achieve a curved crystalline glass member (not shown).

Figure 5:
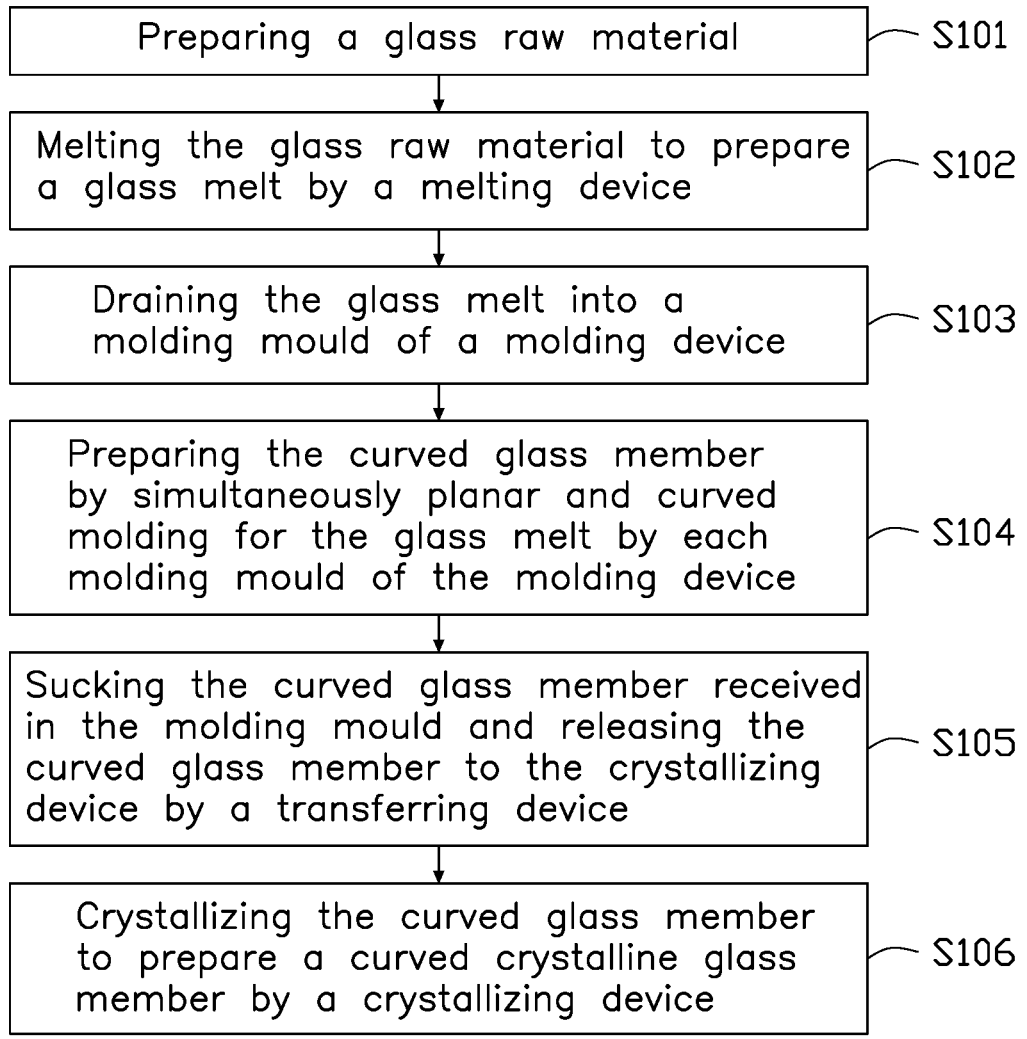
FIG. 5 is a flowchart of an embodiment of a glass manufacturing method using the glass production apparatus of FIG. 1.

FIG. 5 shows a flowchart of a glass manufacturing method of the glass production apparatus to continuously prepare a curved crystalline glass member (not shown).

Referring to FIG. 1 to FIG. 5, the glass manufacturing method in a first embodiment can include the following processes.

S101: a glass raw material is prepared.

Specifically, the silicon dioxide having a mass fraction of 50%, the aluminum oxide having a mass fraction of 20%, the magnesium oxide having a mass fraction of 10%, the titanium oxide having a mass fraction of 10%, the trioxide having a mass fraction of 1%, and the additive having a mass fraction of 9% can be mixed to prepare the glass raw material.

S102: the melting device 10 melts the glass raw material to prepare a glass melt.

Specifically, the glass raw material is placed into the crucible of the melting furnace 12 of the melting device 10 and is subjected to a high-temperature by the heating member 13. The stirring mechanism stirs the glass melt in the crucible, and the filtering mechanism filters the glass melt in the crucible during the high-temperature melting process. A temperature of the high-temperature melting treatment is about 1300 degrees Celsius.

S103: the drainage device 20 drains the glass melt into a molding mold 33 of the molding device 30.

Specifically, the temperature controlling mechanism of the drainage device 20 adjusts a temperature of the drainage tube 21 to 900 degrees Celsius to slowly and uniformly cool the glass melt in the drainage tube 21. The temperature controlling mechanism of the molding device 30 preheats each molding mold 33 to about 700 degrees. The drainage device 20 drains the glass melt into a molding mold 33 of the molding device 30, and a temperature of the glass melt flowed into the molding mold 33 is about 700 degrees Celsius.

S104: each molding mold 33 of the molding device 30 prepares the curved glass member 200 by simultaneously molding planar and curved surfaces on the glass melt.

Specifically, the gas protection mechanism of the molding device 30 protects each molding mold 33 acting as the hot press molding mold during molding process and cooling process in a protective atmosphere. The manipulator 34 places the male mold 332 on a female mold 331. The male mold 332 of each molding mold 33 is pressured to 0.3 of standard atmospheric pressure and is held for 10 minutes. Then each molding mold 33 cools to room temperature. Finally, the manipulator 34 separates the male mold 332 from the female mold 331.

It can be understood that the gas protection mechanism of the molding device 30 protects each molding mold 33 acting as heat absorbing molding mold during molding process and cooling process in a protective atmosphere. Each molding mold 33 is evacuated by the vacuum generator (not shown) at one standard atmospheric pressure and held for 10 minutes. Then each molding mold 33 cools to room temperature to prepare the curved glass member 200 by simultaneously molding planar and curved surfaces on the glass melt.

It can be understood that the gas protection mechanism of the molding device 30 protects each molding mold 33 acting as the hot pressing and heat absorbing composite molding mold during molding process and cooling process in a protective atmosphere. The manipulator 34 places the male mold 332 on a female mold 331. The male mold 332 of each molding mold 33 is pressured to 0.2 of standard atmospheric pressure and held for 10 minutes. Simultaneously, the female mold 331 of each molding mold 33 is evacuated by the vacuum generator (not shown) at one standard atmospheric pressure and held for 10 minutes. Then each molding mold 33 cools to room temperature. Finally, the manipulator 34 separates the male mold 332 from the female mold 331 to prepare the curved glass member 200.

S105: the transferring device 40 gets the curved glass member 200 received in the molding mold 33 and releases the curved glass member 200 to the crystallizing device 50.

Specifically, the robot arm 41 of the transferring device 40 drives the suction member 42 to get the curved glass member 200 received in the molding mold 33 and to release the curved glass member 200 to the transferring mechanism 51 of the crystallizing device 50.

S106: the crystallizing device 50 crystallizes the curved glass member 200 to prepare a curved crystalline glass member (not shown).

Specifically, the transferring mechanism 51 of the crystallizing device 50 transfers the curved glass member 200 into the crystallizing furnace 52 of the crystallizing device 50. The crystallizing furnace 52 performs crystallization heating treatment on the curved glass member 200. The crystallization heating treatment employs a temperature-step controlling system. The temperature controlling system is that, in the first stage, the crystallizing furnace 52 is heated to 680 degrees at a rate of 10 degrees/min, and held for 2 hours. In the second stage, the crystallizing furnace 52 is further heated to 800 degrees at a rate of 10 degrees/min and held for 4 hours. Finally, the crystallized furnace 52 is cooled to room temperature to achieve a curved crystalline glass member (not shown).

The glass manufacturing method in second embodiment can include the following processes.

S201: a glass raw material is prepared.

Specifically, the silicon dioxide having a mass fraction of 55%, the aluminum oxide having a mass fraction of 15%, the magnesium oxide having a mass fraction of 5%, the titanium oxide having a mass fraction of 8%, the trioxide having a mass fraction of 2%, and the additive having a mass fraction of 15%, can be mixed to prepare the glass raw material.

S202: the melting device 10 melts the glass raw material to prepare a glass melt.

Specifically, the glass raw material is placed into the crucible of the melting furnace 12 of the melting device 10 and is subjected to high-temperature by the heating member 13. The stirring mechanism stirs the glass melt in the crucible, and the filtering mechanism filters the glass melt in the crucible during a high-temperature melting process. A temperature of the high-temperature melting treatment is about 1500 degrees Celsius.

S203: the drainage device 20 drains the glass melt into a molding mold 33 of the molding device 30.

Specifically, the temperature controlling mechanism of the drainage device 20 adjusts a temperature of the drainage tube 21 to 900 degrees Celsius to slowly and uniformly cool the glass melt in the drainage tube 21. The temperature controlling mechanism of the molding device 30 preheats each molding mold 33 to 750 degrees. The drainage device 20 drains the glass melt into a molding mold 33 of the molding device 30, and a temperature of the glass melt flowing into the molding mold 33 is 800 degrees Celsius.

S204: each molding mold 33 of the molding device 30 prepares the curved glass member 200 by simultaneously molding planar and curved surfaces on the glass melt.

Specifically, the gas protection mechanism of the molding device 30 protects each molding mold 33 acting as the hot press molding mold during molding process and cooling process in a protective atmosphere. The manipulator 34 places the male mold 332 on a female mold 331. The male mold 332 of each molding mold 33 is pressured to 0.5 of standard atmospheric pressure and is held for 15 minutes. Then each molding mold 33 cools to room temperature. Finally, the manipulator 34 separates the male mold 332 from the female mold 331.

It can be understood that the gas protection mechanism of the molding device 30 protects each molding mold 33 acting as heat absorbing molding mold during molding process and cooling process in a protective atmosphere. Each molding mold 33 is evacuated by the vacuum generator (not shown) at 1.5 standard atmospheric pressure and held for 20 minutes. Then each molding mold 33 cools to room temperature to prepare the curved glass member 200 by simultaneously mold planar and curved surfaces for the glass melt.

It can be understood that the gas protection mechanism of the molding device 30 protects each molding mold 33 acting as the hot pressing and heat absorbing composite molding mold during molding process and cooling process in a protective atmosphere. The manipulator 34 places the male mold 332 on a female mold 331. The male mold 332 of each molding mold 33 is pressured to 0.4 of standard atmospheric pressure and held for 15 minutes. Simultaneously, the female mold 331 of each molding mold 33 is evacuated by the vacuum generator (not shown) at 1.5 standard atmospheric pressure and held for 15 minutes. Then each molding mold 33 cools to room temperature. Finally, the manipulator 34 separates the male mold 332 from the female mold 331 to prepare the curved glass member 200.

S205: the transferring device 40 gets the curved glass member 200 received in the molding mold 33 and then releases the curved glass member 200 to the crystallizing device 50.

Specifically, the robot arm 41 of the transferring device 40 drives the suction member 42 to get the curved glass member 200 received in the molding mold 33 and then release the curved glass member 200 to the transferring mechanism 51 of the crystallizing device 50.

Step S206: the crystallizing device 50 crystallizes the curved glass member 200 to prepare a curved crystalline glass member (not shown).

Specifically, the transferring mechanism 51 of the crystallizing device 50 transfers the curved glass member 200 into the crystallizing furnace 52 of the crystallizing device 50. The crystallizing furnace 52 performs crystallization heating treatment on the curved glass member 200. The crystallization heating treatment employs a step-temperature controlling system. The temperature-step controlling system is that, in the first stage, the crystallizing furnace 52 is heated to 730 degrees at a rate of 10 degrees/min, and held for 3.5 hours. In the second stage, the crystallizing furnace 52 is further heated to 850 degrees at a rate of 10 degrees/min and held for 7 hours. Finally, the crystallized furnace 52 is cooled to room temperature to achieve a curved crystalline glass member (not shown).

The glass manufacturing method in third embodiment can include the following processes.

S301: a glass raw material is prepared.

Specifically, the silicon dioxide having a mass fraction of 60%, the aluminum oxide having a mass fraction of 10%, the magnesium oxide having a mass fraction of 10%, the titanium oxide having a mass fraction of 10%, the trioxide having a mass fraction of 10%, and the additive having a mass fraction of 10%, can be mixed to prepare the glass raw material.

S302: the melting device 10 melts the glass raw material to prepare a glass melt.

Specifically, the glass raw material is placed into the crucible of the melting furnace 12 of the melting device 10 and is subjected to high-temperature by the heating member 13. The stirring mechanism stirs the glass melt in the crucible, and the filtering mechanism filters the glass melt in the crucible to during the melting process. A temperature of the high-temperature melting treatment is 1600 degrees Celsius.

S303: the drainage device 20 drains the glass melt into a molding mold 33 of the molding device 30.

Specifically, the temperature controlling mechanism of the drainage device 20 adjusts a temperature of the drainage tube 21 to 900 degrees Celsius to slowly and uniformly cool the glass melt in the drainage tube 21. The temperature controlling mechanism of the molding device 30 preheats each molding mold 33 to 850 degrees. The drainage device 20 drains the glass melt into a molding mold 33 of the molding device 30, and a temperature of the glass melt flowing into the molding mold 33 is 850 degrees Celsius.

S304: each molding mold 33 of the molding device 30 prepares the curved glass member 200 by simultaneously molding planar and curved surfaces on the glass melt.

Specifically, the gas protection mechanism of the molding device 30 protects each molding mold 33 acting as the hot press molding mold during molding process and cooling process in a protective atmosphere. The manipulator 34 places the male mold 332 on a female mold 331. The male mold 332 of each molding mold 33 is pressured to 0.6 of standard atmospheric pressure and is held for 20 minutes. Then each molding mold 33 cools to room temperature. Finally, the manipulator 34 separates the male mold 332 from the female mold 331 to prepare the curved glass member 200.

It can be understood that the gas protection mechanism of the molding device 30 protects each molding mold 33 acting as heat absorbing molding mold during molding process and cooling process in a protective atmosphere. Each molding mold 33 is evacuated by the vacuum generator (not shown) at 2 standard atmospheric pressure and held for 25 minutes. Then each molding mold 33 cools to room temperature to prepare the curved glass member 200 by simultaneously molding planar and curved surfaces on the glass melt.

It can be understood that the gas protection mechanism of the molding device 30 protects each molding mold 33 acting as the hot pressing and heat absorbing composite molding mold during molding process and cooling process in a protective atmosphere. The manipulator 34 places the male mold 332 on a female mold 331. The male mold 332 of each molding mold 33 is pressured to 0.5 of standard atmospheric pressure and held for 10 minutes. Simultaneously, the female mold 331 of each molding mold 33 is evacuated by the vacuum generator (not shown) at 2 standard atmospheric pressure and held for 10 minutes. Then each molding mold 33 cools to room temperature. Finally, the manipulator 34 separates the male mold 332 from the female mold 331 to prepare the curved glass member 200.

S305: the transferring device 40 gets the curved glass member 200 received in the molding mold 33 and releases same to the crystallizing device 50.

Specifically, the robot arm 41 of the transferring device 40 drives the suction member 42 to get the curved glass member 200 received in the molding mold 33 and release the curved glass member 200 to the transferring mechanism 51 of the crystallizing device 50.

Step S306: the crystallizing device 50 crystallizes the curved glass member 200 to prepare a curved crystalline glass member (not shown).

Specifically, the transferring mechanism 51 of the crystallizing device 50 transfers the curved glass member 200 into the crystallizing furnace 52 of the crystallizing device 50. The crystallizing furnace 52 performs crystallization heating treatment on the curved glass member 200. The crystallization heating treatment employs a temperature-step controlling system. The temperature controlling system is that, in the first stage, the crystallizing furnace 52 is heated to 780 degrees at a rate of 10 degrees/min, and held for 5 hours. In the second stage, the crystallizing furnace 52 is further heated to 900 degrees at a rate of 10 degrees/min and held for 10 hours. Finally, the crystallized furnace 52 is cooled to room temperature to obtain a curved crystalline glass member (not shown).

It can be understood that processes S105, S205, and S305 can be removed without affecting the crystallizing of the curved glass member 200 by the crystallizing device 50.

In other embodiment, the transferring device 40 can be omitted, the curved glass member 200 prepared by the molding device 30 can be directly transferred to the crystallizing device 50 by an operator.

In other embodiment, the supporting table 31 and the manipulator 34 can be omitted, each molding mold 33 can be directly opened or closed by an operator. In addition, each molding mold 33 can function as the heat absorbing molding mold without opening and closing.

The embodiments shown and described above are only examples. Many details are often found in the art such as the other features of a glass production apparatus and a glass manufacturing method. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A glass production apparatus, adapted for continuously preparing a curved crystalline glass member, the glass production apparatus comprising:
    a melting device configured for melting a glass raw material to prepare a glass melt;
    a drainage device;
    a molding device comprising:
    a rotary table; and
    a plurality of molding molds positioned on the rotary table, a molding cavity defined in each of the plurality of molding mold; and
    a crystallizing device;
    wherein the drainage device drains the glass melt into a molding molds, the rotary table moves each of the molding molds toward to or away from the drainage tube, at least one portion of the molding cavity comprises a plane surface and at least one portion of the molding cavity comprises a curved surface to prepare a curved glass member by simultaneously molding planar and curved surfaces on the glass melt, and the crystallizing device crystallizes the curved glass member to obtain the curved crystalline glass member.

2. The glass production apparatus of claim 1, wherein the molding device further comprises a supporting table and a manipulator, the rotary table is positioned on the supporting table;
    each of the molding molds is a hot press molding mold and comprises a female mold and a male mold engaged with the female mold, the molding cavity is defined in the female mold and between the female mold and the male mold;
    the male mold presses the melt glass in the molding cavity to prepare the curved glass member, the manipulator is positioned on the supporting table, and the manipulator separates the male mold from the female mold or engages the male mold to the female mold to open or close the molding mold, respectively.

3. The glass production apparatus of claim 2, wherein the male mold is made of graphite or platinized cemented carbide.

4. The glass production apparatus of claim 1, wherein the molding device further comprises a supporting table and a manipulator, the rotary table is positioned on the supporting table;
    each of the molding molds is a hot pressing and heat absorbing composite molding mold, each of the molding molds comprises a female mold and a male mold engaged with the female mold, the molding cavity is defined in the female mold between the female mold and the male mold, the female mold is connected to a vacuum generator;
    the male mold presses the melt glass in the molding cavity and the glass melt is vacuum-adsorbed by the female mold to prepare the curved glass member, the manipulator is positioned on the supporting table, and the manipulator separates the male mold from the female mold or engages the male mold to the female mold to open or close the molding mold, respectively.

5. The glass production apparatus of claim 4, wherein the female mold is made of graphite or a porous ceramic material.

6. The glass production apparatus of claim 1, wherein each of the molding molds is a heat absorbing molding mold, each of the molding molds is connected to a vacuum generator, each of the molding molds adsorbs the glass melt to the curved glass member by simultaneously molding planar and curved surfaces on the glass melt.

7. The glass production apparatus of claim 6, wherein each of the molding molds is made of graphite or porous ceramic material.

8. The glass production apparatus of claim 1, wherein the melting device comprises a base, a melting furnace, and a heating member, the melting furnace is positioned on the base, the heating element is inserted into the melting furnace to heat the melting furnace, the drainage device comprises a drainage tube, the drainage tube is positioned on the melting furnace, the drainage tube communicates with the melting furnace to drain the glass melt to a molding mold, and a section of an opening of the drainage tube is designed to a predetermined shape according to a desired shape and a desired size of the curved glass member.

9. The glass production apparatus of claim 8, wherein the section of an opening of the drainage tube is rectangular or elliptical.

10. The glass production apparatus of claim 1, wherein the glass production apparatus further comprises a transferring device, the transferring device comprises a robot arm and a suction member, the robot arm is adjacent to the molding device, the suction member is positioned on an end of the robot arm, the robot arm moves the suction member, and the suction member retrieves the curved glass member received in a molding mold and releases the curved glass member to the crystallizing device.

11. The glass production apparatus of claim 1, wherein the crystallizing device comprises a transferring mechanism and a crystallizing furnace, the transferring mechanism transfers the curved glass member into the crystallizing furnace, and the crystallizing furnace crystallizes the curved glass member to obtain the curved crystalline glass member.

* * * * *